United States Patent [19]

Chute

[11] 3,757,184
[45] Sept. 4, 1973

[54] ALTERNATING CURRENT MOTOR SPEED CONTROL CIRCUIT

[75] Inventor: Robert D. Chute, Southfield, Mich.

[73] Assignee: Burroughs Corporation, Detroit, Mich.

[22] Filed: Mar. 6, 1972

[21] Appl. No.: 232,081

Related U.S. Application Data

[63] Continuation of Ser. No. 873,803, Nov. 4, 1969, abandoned.

[52] U.S. Cl. ............... 318/231, 318/345, 328/25, 307/271
[51] Int. Cl. ............................................ H02p 5/34
[58] Field of Search ............... 307/225, 233, 271, 307/252; 328/25, 30; 318/227, 231, 345; 323/22 SC; 321/9, 61

[56] References Cited
UNITED STATES PATENTS

| | | | |
|---|---|---|---|
| 3,259,825 | 7/1966 | James | 323/22 SC |
| 3,304,487 | 2/1967 | McCaskey | 323/22 SC |
| 3,392,626 | 7/1968 | Miller | 323/22 SC |
| 3,340,460 | 9/1967 | Clarke | 323/22 SC |
| 3,524,078 | 7/1967 | Harris | 307/252 |
| 3,577,012 | 5/1971 | Dummermuth | 307/271 |
| 2,665,379 | 1/1954 | Hadden | 328/25 |

Primary Examiner—Bernard A. Gilheany
Assistant Examiner—Thomas Langer
Attorney—Paul W. Fish et al.

[57] ABSTRACT

An induction motor speed control circuit which creates sub-multiples of the power line frequency by selective switching of the line voltage to allow certain cycles representative of a bilateral network in the form of a frequency lower than that of the power source to pass through and operate the motor. The circuit employs a free-running unijunction transistor relaxation oscillator for firing a controlled rectifier, the period of oscillation being a multiple numberof half cycles of the line frequency and obtained by the selection of one of several resistors switched into the emitter circuit. A pulse generated by a zener diode at each of the zero crossings of the line voltage is superimposed by a transformer upon the sawtooth waveform generated by the relaxation oscillator with the result that the oscillator is synchronized to fire the rectifier precisely at the start of a new one-half cycle of the power line frequency. The circuit performs the conversion of the frequencies of large amounts of power at lower power levels and with inexpensive circuit components.

16 Claims, 13 Drawing Figures

PATENTED SEP 4 1973

INVENTOR.
ROBERT D. CHUTE

BY Ralzemond B. Carter

ATTORNEY

ALTERNATING CURRENT MOTOR SPEED CONTROL CIRCUIT

This is a continuation of application Ser. No. 873,803, filed Nov. 4, 1969 now abandoned.

BACKGROUND OF THE INVENTION

Controlling the speed of induction motors by frequency control has been accomplished with some degree of success in the past. However, such previously suggested frequency control systems required rectification of the line voltage and then re-inversion into the desired frequency either by rotary or static converters. Such prior art techniques converted the frequencies at high power levels and required relatively costly equipment. Variable frequency control produces a variable speed with stability only as good as the controlling frequency. Other prior art methods of speed control required additional windings within the stator or special rotor windings.

SUMMARY OF THE INVENTION

An important object of the invention is to provide an improved circuit for controlling the speed of an induction motor and particularly one which accomplishes this object with a simplified switching provision requiring inexpensive as well as reliable circuit components.

Another important object of the invention is to provide an improved motor speed control circuit which, although it changes or converts frequencies of relatively large amounts of electrical power, it achieves this result by timing the switching at relatively low power levels.

Another important object of the invention is to provide an improved control circuit for which produces sawtooth pulse waveforms corresponding in duration to a multiple number of half cycles of an alternating current reference voltage and precisely synchronized therewith and which provides a selection of such pulses at one emitter of several different sub-frequencies of the fundamental frequency of the AC voltage reference.

A further important object of the invention is to provide an improved control circuit of the aforesaid nature which produces a negligible amount of radio frequency interference and thus eliminates extensive provisions for suppressing such unwanted effect on neighboring electrical equipment.

In carrying out these objects, the present invention contemplates a control circuit which in its broader aspects provides pulses not only precisely corresponding in duration to one or more half cycles of an alternating current reference voltage but also occurring at a sub-frequency thereof. This control circuit may be utilized as herein disclosed to control the speed of an induction motor enabling it to operate either at the fundamental frequency of the power source or at a selected one of several sub-frequencies of this source thereby enabling the motor to be operated at several different discrete speeds.

More particularly, the control circuit of this invention employs a unijunction transistor relaxation oscillator for firing one or more controlled rectifiers which operate to control the supply of voltage impulses to an inductive load, such as a split phase AC motor. The duration of each firing of the rectifier is governed to coincide precisely with the time span of one or a multiple number of half cycles of the energizing voltage source. The sawtooth waveform of the relaxation oscillator is made exactly equal to a multiple number of half cycles of the power source and the starting time of the oscillator is governed to coincide with the start of a half cycle of the fundamental frequency of the power source. Such precise control is obtained by a pulse generator, exemplified as a zener diode in this instance, which responds to the zero crossings of the fundamental frequency and superimposes its pulses onto the sawtooth waveforms produced by the oscillator. The oscillation period in multiples of half cycles is determined by the selective switching of anyone of several different resistors into the emitter circuit of the relaxation oscillator. The result is that by the superimposition of control pulses onto the oscillator waveform the frequency of the energizing voltage delivered to a motor may be precisely subdivided into a number of lower frequencies thus enabling the motor to be operated at anyone of several discrete speeds. Moreover, because all switching is initiated at the zero points of the sine wave and terminates at the zero current points thereof, an inconsequential amount of radio interference is produced which can be ignored.

Other objects, advantages and meritorious features of the invention will become more fully apparent from the following specification taken in conjunction with the accompanying drawings wherein.

DESCRIPTION OF A PREFERRED EMBODIMENT

Figures 1, 2A, 2B, 2C, 2D, 2E, 2F:
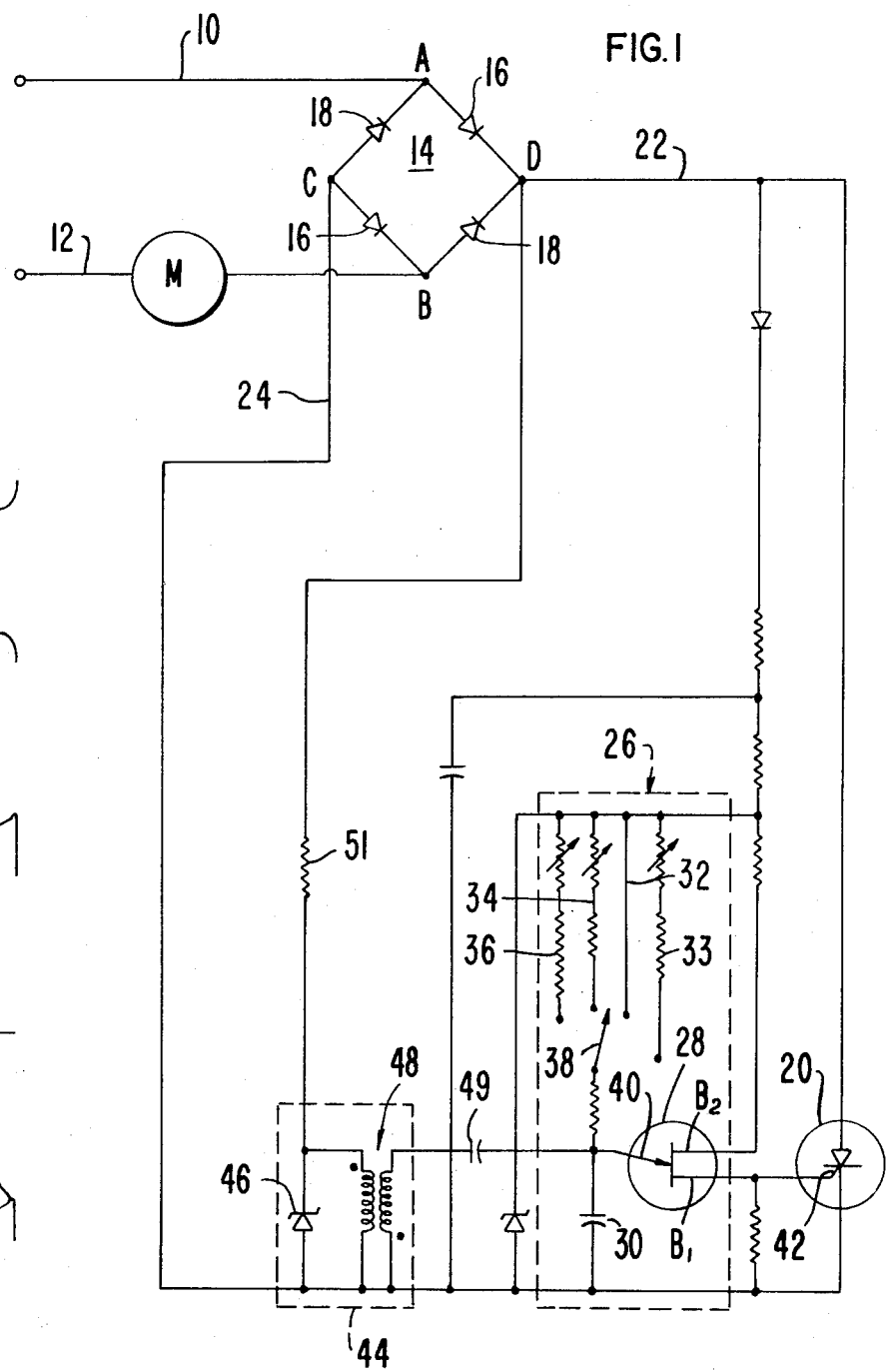
FIG. 1 is a schematic diagram illustrating a circuit embodying the invention.
FIG. 2A to 2F illustrate waveforms of voltages existing across certain portions of the circuit of FIG. 1 during operation thereof.

Referring now to FIG. 1 in detail, there is provided a control circuit capable of dividing the frequency of an alternating current voltage source as applied to an AC motor so that the motor may be driven at discrete speeds of whole number fractions of the normal speed thereof. The circuit is provided with a pair of input terminal leads 10 and 12 for connection to a suitable alternating current supply, such as one having a 115 AC voltage and a frequency of 60 c.p.s. An inductive load in the form of a motor M is shown schematically connected in circuit with one input lead 12. The two input leads are connected to opposite points A and B of a full wave rectifying bridge network generally indicated at 14, which includes a first pair of diodes 16—16 which are arranged to pass current to the motor during one half portion of each full cycle of the power source and a second pair of diodes 18—18 arranged to pass current to the motor during the second half portion of each full cycle.

The bridge network 14 modifies the sinusoidal waveform of the voltage source, illustrated in FIG. 2A, to the unidirectional voltage waveform exhibit in FIG. 2B, and applies such modified waveform to the opposite points C and D of the bridge network. Connected across these points is a silicon controlled rectifier 20 having an input lead 22 connected to the positive side D of the bridge and an output lead 24 connected to the negative side C of the bridge. Thus, the voltage applied across the controlled rectifier 20 is represented by that illustrated in FIG. 2B. Any current flowing to the motor M is required to pass through the controlled rectifier 20.

Governing the firing of the silicon controlled rectifier 20 is a unijunction transistor relaxation oscillator sub-circuit whose period of oscillation will be set to equal approximately a plural number of half cycles of the reference voltage or the power source connected to the input leads 10 and 12. In FIG. 1 the oscillator circuit is indicated generally as being enclosed within the dotted outline 26 and includes a unijunction transistor 28, a capacitor 30 and a bank of charging resistors of different values, such as indicated at 32, 34 and 36, any one of which is selectable by a switch 38.

As is known in the art (See General Electric "Silicon Controlled Rectifier Manual", Third Edition and "Basic Oscillators" by Irving M. Gottlieb, copyright 1963, pages 192 to 195), when the voltage at the emitter 40 of the unijunction transistor device 28 is less than a predetermined peak-point voltage, the device has the characteristic of a high impedance and therefore substantially no current flows between its emitter and base-one electrode identified at $B_1$. However, when the voltage at the emitter exceeds the peak-point voltage, the unijunction transistor becomes increasingly conducting and exhibits a low impedance characteristic between the emitter and the base-one electrode.

In operation of the unijunction transistor circuit as a relaxation oscillator, the capacitor 30 is charged at a rate dependent on the value of the resistor selected by switch 38 and entered into the circuit of emitter 40. When the capacitor charge attains the peak-point voltage of the emitter 40, the cumulative process of increased charge injection and spread in the unijunction transistor body will cause the capacitor to "see" a relatively low resistance and thereby discharge through the base-one electrode to the gate 42 of the silicon controlled rectifier 20 to trigger the same into conduction until the anode current in the rectifier falls below the holding current level. When the capacitor discharges to a sufficiently low voltage, injection in the unijunction transistor body ceases and the section thereof to which base-one electrode is connected reverts to its initial state of high resistance. The capacitor charge-discharge cycle then repeats. The recurring discharge of capacitor 30 through the unijunction transistor 28 produces a series of pulses in the nature of sharp voltage spikes at the base-one electrode which are applied to the gate 42 of the rectifier 20 to trigger the same. The capacitor 30 charges at a substantially linear rate and the resultant sawtooth voltage waveform across the capacitor appears at the emitter 40.

The present invention protracts the time period of the sawtooth pulses generated by the relaxation oscillator for a number of consecutive half cycles of the fundamental frequency. In addition, it provides precise synchronization of these pulses with the AC source with which the oscillator is coupled as well as precise triggering of the controlled rectifier 20. The invention further provides a selection of anyone of several sub-frequencies of the fundamental frequency for applying the selected frequency to a utilization device, the motor M in the case of FIG. 1.

In the circuit of FIG. 1, the resistive value selected by the switch 38 in conjunction with the capacitor 30 determines the time interval of the sawtooth pulse. Of the several available resistances for selection by sawtooth 38, one of these, namely that indicated at 32, is substantially zero. If this resistive value is selected by the switch 38, it will be ineffective to divide the frequency and thus the frequency and full power of the AC voltage source will be applied to the motor M for full speed operation. However, when any remaining resistor, such as indicated at 34 and 36, is incorporated into the circuit of the emitter 40, each is or may be adjusted to such a value that in cooperation with the capacitor 30 a timing interval for each sawtooth pulse can be made to equal approximately the time period of a multiple number of consecutive half cycles of the fundamental frequency. In other words, these selectable resistive values will provide different periods of oscillation for the unijunction transistor each of which will approximately equal a different multiple number of half cycles of the line frequency.

For example, if resistor 34 is selected by switch 38, the duration of the sawtooth pulse generated by the relaxation oscillator can be made to very closely equal to the duration of three consecutive half cycles of the fundamental frequency. FIG. 2C illustrates the production of a sawtooth waveform of this character by the oscillator which as shown stretches for three half cycles of the AC source. Similarly, if resistor 36 is selected for use in the circuit, it can extend the pulse period of the sawtooth waveform so that it substantially equals the duration of five consecutive half cycles of the AC source. Additional resistors can be incorporated in the bank of resistances represented by reference characters 32 to 36, but it has been found that any odd number division of the fundamental frequency beyond one seventh thereof will cause the loss of too much torque for it to be useful by a motor. It is apparent that the circuit of FIG. 1, so far as it has been described, will generate sawtooth waveforms within that circuit portion enclosed by the dotted outline 26 having an odd number division of the frequency of the AC source.

A feature of the invention is the provision for obtaining precise synchronization of the selected sawtooth waveform with the fundamental frequency, and with the result that each sawtooth waveform will start at an instant when the power line voltage (at fundamental frequency) changes sign. For achieving this object, the circuit contains a provision 44 for generating a pulse each time the AC power source passes through zero and for superimposing such responsive pulses upon the sawtooth voltage appearing at the emitter 40. This is accomplished in the circuit of FIG. 1 by the cooperation of a zener diode 46 and a transformer 48. Each time the AC line voltage passes through zero, the zener diode emits a pulse which is received by the primary winding of the transformer 48 and applied by the secondary winding to the sawtooth waveform generated by the oscillator circuit 26. In the operation of the circuit, the zener diode 46 holds a constant low voltage (6 to 7 volts) during all of the sine wave except when the instantaneous voltage passes through zero. At this time the voltage across the zener diode also drops to zero. This appears to the transformer 48 as a minus going change of current. The transformer inverts this to a positive going pulse. The small capacitor 49 between the transformer and the emitter of the unijunction transistor serves to impress this plus or positive going pulse onto the rising sawtooth wave of the emitter 40.

In this manner the pulse transformer superimposes all of its pulses upon the sawtooth waveform as small voltage spikes identified at 50 in FIG. 2C. The value of each resistor 34 and 36 is so determined, as previously mentioned, that when incorporated into the circuit it will stretch the sawtooth waveform over an odd number of half cycles of the AC source and terminate the ramp of the waveform close to the peak-point voltage of the unijunction transistor 28. As the last half cycle is concluded, the voltage spike 50 generated by its zero crossing will carry the voltage at the emitter 40 over the peak-point level so that the controlled rectifier 20 is triggered at exactly the commencement of a new half cycle of the AC frequency. The rectifier 20 will remain on for the duration of the new half cycle and furnish power to the load circuit for that interval of time. The rectifier will then cease to pass current and will remain off until the next sawtooth pulse produced by the wave generator represented by the oscillator circuit 26 attains the peak-point voltage at which time it will be fired again. The result is the production of alternating pulses which drive the motor at reduced speed and with less power.

Other components having conventional functions are included in the circuit of FIG. 1. The resistor 51 associated with zener diode 46 absorbs the line voltage less the zener voltage for limiting the power dissipation of that diode. Unreferenced components associated with the unijunction transistor circuit 26 provide a constant regulated DC voltage therefore along with proper biasing and compensation for that transistor.

FIG. 2D illustrates the voltage waveform as applied to the motor M when the frequency of the AC source is divided by one third. Each alternation in the waveform occurs every third half cycle of the line frequency and commences precisely as the third spike 50 on the sawtooth ramp, which is responsive to the zero cross crossing of the line frequency, carries the voltage of the capacitor 30 over the peak-point of the unijunction transistor 28 thereby triggering the controlled rectifier 20 into conduction. The conduction is sustained until the next zero crossing of the line frequency in the manner previously explained herein. The motor is thus driven at substantially one third its full speed and with approximately one third of the power of the line voltage. It is evident also that the switching of the controlled rectifier occurs at very low power levels either at or in the immediate vicinity of the zero crossing of the line voltage.

The bank of resistors 32 to 36 provides a variety of frequency divisions by integral odd numbers including one which applies the line frequency to the motor at full power. The motor may therefore be quickly adjusted to a variety of speeds at the option of the operator. If desired a resistor may be included in the bank which divides the frequency by an even number integral in order to brake the motor to a quick stop. For this purpose a resistor 33 may be provided in the circuit which produces a sawtooth waveform having a duration of approximately one full cycle of the line voltage. With this resistance incorporated in the circuit of the emitter 40, the second zero crossing spike 50 superimposed on each sawtooth ramp, as illustrated in FIG. 2E, will cause discharge of the capacitor 30 and the firing of the controlled rectifier 20. The result is a series of half cycle voltage pulses all of one polarity separated from one another by half cycles as illustrated in FIG. 2F. The application of such direct current pulses to an induction motor will cause it to brake quickly to a stop. With the addition of this stopping feature, the circuit of FIG. 1 enables the operator to change the speed of the motor M or to stop it by merely selecting one of several available resistive components into the circuit by means of a convenient switch, each resistance providing a sub frequency of the AC voltage source for its particular function.

Figures 3, 4A, 4B, 4C, 4D, 4E:
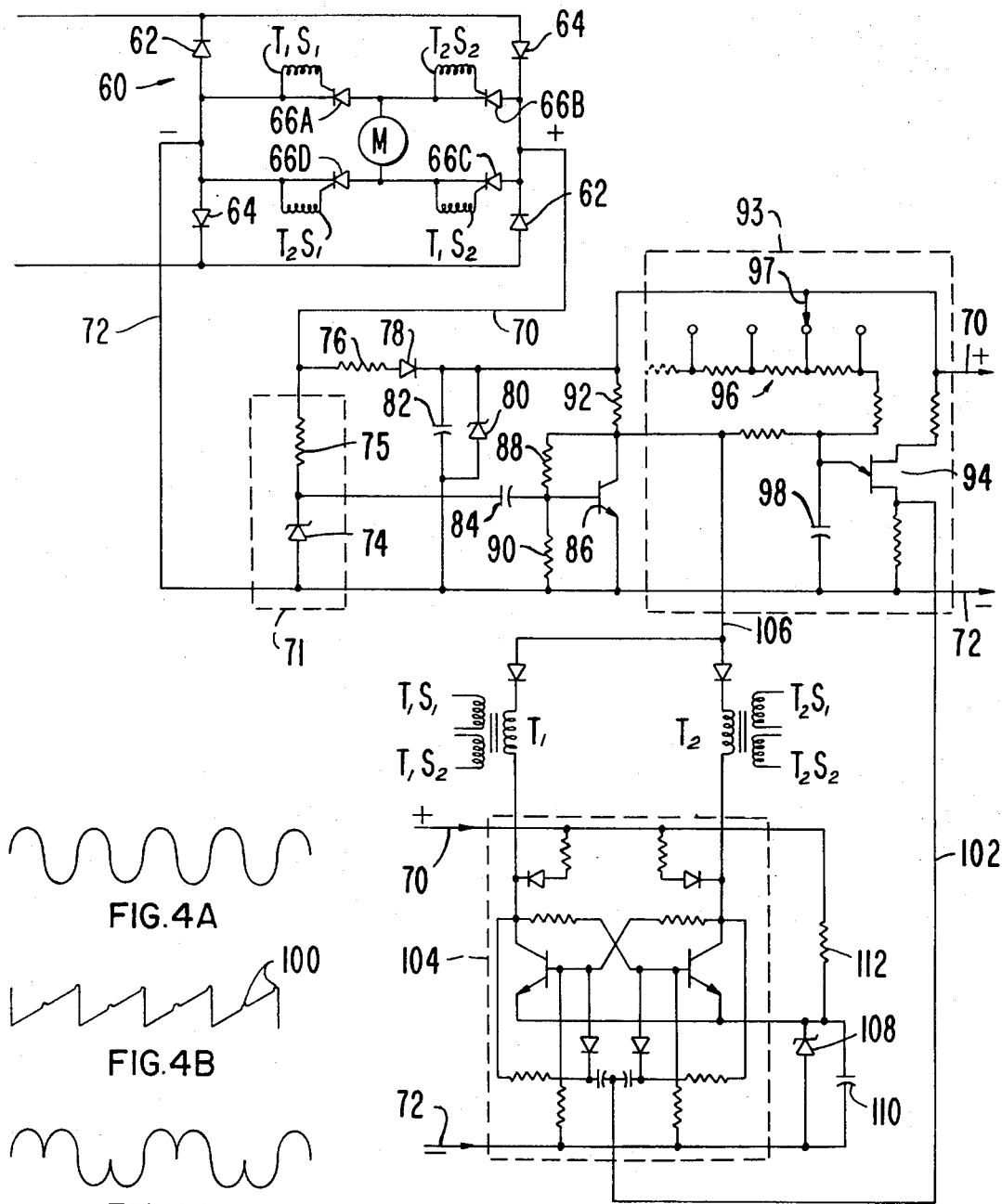
FIG. 3 is a schematic diagram illustrating another circuit embodying the invention and capable of dividing the fundamental frequency into any sub-multiple thereof.
FIGS. 4A to 4E illustrate typical voltage waveforms capable of of being developed the circuit of FIG. 3 for driving a motor.

FIG. 3 and FIGS. 4A and 4E illustrate a version of the invention capable of dividing the power line frequency into any integral sub-multiple, whether an odd or even number, and employing the divided frequency for driving an induction load, such as a motor, at full speed, one half, one third, one fourth, one fifth, etc. In FIG. 3, the motor M has its armature connected in bridging relationship with a bridge circuit generally indicated at 60 and including two pairs of diodes 62—62 and 64—64 corresponding in position and function to the diodes 16—16 and 18—18 of the circuit in FIG. 1 and further containing four silicon controlled rectifiers 66A, 66B, 66C, and 66D connected into the bridge network in the manner shown between the diodes and the motor. As in the operation of the circuit of FIG. 1, the two pairs of diodes modify the alternating waveform of the voltage source to the unidirectional waveform shown in FIG. 2B.

As will be described more fully hereinafter, the controlled rectifiers 66A to 66D further modify the unidirectional waveform into the alternate groupings of half cycles such as shown in FIGS. 4C and 4E, this being achieved by the controlled firing of the rectifiers. In the operation of the circuit of FIG. 3, the rectifiers 66A and 66C are fired together and rectifiers 66B and 66D are fired together, the sequencing of these combinations producing various frequency divisions, samples of which are illustrated in FIGS. 4C and 4E. In the circuit of FIG. 3, the controlled rectifiers are triggered by means of two pulse transformers $T_1$ and $T_2$ (shown lower in FIG. 3), the secondaries of which are in the bridge circuit. With reference to the bridge circuit, the secondaries of one transformer $T_1$ are identified at $T_1S_1$ and $T_1S_2$ as being respectively associated with the pair of rectifiers 66A and 66C and the secondaries of the other transformer $T_2$ are indicated at $T_2S_1$ and $T_2S_2$ as being respectively associated with rectifiers 66B and 66D.

As in the previously described embodiment of the invention, the bridge circuit 60 has two input leads 70 and 72, the former connected to the positive side of the bridge circuit and the latter to the negative side. Connected across these leads is the control circuit for governing the firing of the controlled rectifiers in the bridge circuit. As in the earlier described embodiment, the control circuit contains means for producing a small negative voltage spike, such as 6 volts, at each instant the line voltage crosses zero thus functioning similar to the section 44 of the circuit of FIG. 1. For this purpose there is included in section 71 of FIG. 3 a zener diode 74 which emits a negative pulse spike at each crossing of zero voltage by the AC source, or producing 120 pulses per second if the AC frequency is 60 cycles. A resistance 75 having the same function as resistance 51 in FIG. 1 is associated with the zener diode. A regulated power supply in the circuit, which in this instance may be 20 volts, operates from the unfiltered rectified line voltage and includes resistor 76 and a diode 78 needed for power supply and a zener diode 80 and a capacitor 82 in the circuit arrangement shown. Means is provided in the control circuit which serves as an inverter producing a plus going spike for each negative one received from the zener diode 74 and also references these spikes to the negative return line 72. Included in this portion of the circuit is a capacitor 84 to couple these pulses from the zener diode 74 to the base of a transistor 86. Further included in this circuit portion are resistances 88, 90 and 92 which cooperate with the capacitor and transistor to provide positive output signals coinciding in time with the zero crossings of the AC source.

Section 93 of the circuit in FIG. 3 functions as a relaxation oscillator and corresponds generally in function to section 26 of FIG. 1. Included in section 93 is a unijunction transistor 94 cooperating with a variable impedance device generally indicated at 96 and a capacitor 98 for producing a sawtooth waveform approximating the time span of two or more consecutive half cycles of the line frequency. As in the circuit of FIG. 1, the individual spikes generated by zener diode 74, signifying the crossing of the zero voltage by the line frequency, are impressed upon the sawtooth waveform as small positive excursions 100 in the manner illustrated in FIG. 4B. As in the case of the circuit of FIG. 1, the variable impedance provision 96 is adjustable to provide a resistive value such that the time span of the sawtooth waveform will approximate the prescribed multiple number of half cycles of the AC source to obtain the desired frequency division. The variable impedance may be in the form of a stepped potentiometer as shown including a plurality of resistive elements connected in series which are cut in or out of the emitter circuit by a slidable contact arm 97. In operation, as the ramp of the selected sawtooth waveform approaches the peak-point voltage of the unijunction transistor it is carried thereover by the voltage spike occurring at the next zero crossing of the line frequency thereby discharging the capacitor. The positive pulses resulting from the discharge of the capacitor 98 into the emitter and through the base of the unijunction transistor are conveyed by line 102 to the controlled rectifier triggering or switching section of the circuit shown in the bottom of FIG. 3.

That portion of the triggering or switching circuit which is included within the dashed outline 104 is a conventional complementing flip flop wherein the emitters of the transistors are referenced to a predetermined plus voltage, such as 6 volts, and the negative return becomes the negative bias. Reference may be made to the publication, "Design of Transistorized Circuits for Digital Computers" by A. I. Pressman, page 297, a Rider publication, 1969, for further understanding of the nature of the flip flop. Depending upon the state of the flip flop, either one or the other of the two transformers $T_1$ or $T_2$ is enabled by conduction through the transistors of the flip flop. When one or the other transformer is enabled its opposite end is driven by means of pulses received on line 106 from the output of the transistor 86 of the inverter portion of the circuit. As the result, the enabled transformer is pulsed from the zener diode 74 the required number of times as determined by the time span of the sawtooth waveforms produced in the operation of the relaxation oscillator, following which the transformer shuts off and the other transformer is enabled and is pulsed the same amount before the first transformer takes over again.

The two transformers function in this alternate fashion and their respective secondaries are induced in timed sequence to trigger their respective controlled rectifiers in the bridge network 60 with the result that alternating groups of two, three or more half cycles of the fundamental frequency are passed by the rectifiers for operating the motor or other inductive load M. The waveform of FIG. 4C shows an even number division of the line frequency to one half thereof and the waveform of FIG. 4E illustrates an odd number division to one third of the line frequency. To produce the waveform of FIG. 4C, each opposite pair of the controlled rectifiers in the bridge circuit 60 is controlled by its respective transformer $T_1$ or $T_2$ to retain conductivity for one full cycle of the voltage source thereby producing two consecutive voltage pulses on one side of the zero reference before alternating to the other side for a similar number of pulses but of opposite polarity. The frequency of the line voltage is cut in half thereby halfing the speed of the motor but still allowing no reduction in the application of the torque for driving the motor. Similarly, the transformers $T_1$ and $T_2$ are alternately enabled to produce the waveform in FIG. 4E for driving the motor at one third of the speed it is capable of being driven by the line voltage. As shown in FIG. 4E, groups of three consecutive voltage pulses alternate in polarity to drive the motor at one third speed but without reduction in torque. By varying the potentiometer additional divisions of the fundamental frequency may be obtained.

Assisting in the operation of the circuit of FIG. 3 are several circuit elements whose functions may be self evident but are mentioned for a fuller understanding. The resistors 75 and 76 function to absorb access voltage and to reduce power dissipation in their respective zener diodes 74 and 80. Capacitor 82 functions to filter the rectified sine wave so that subsequent portions of this circuit receive regulated and filtered constant direct current. Diode 78 prevents undesired discharge of capacitor 82 back into the bridge circuit 60 when the line voltage goes to zero. Associated with the flip flop portion 104 of the circuit is a zener diode 108 and a capacitor 110, together with resistor 112, which are employed to provide a steady regulated DC bias for the emitters of the flip flop.

While a particular embodiment of the invention has been shown and described, it will be understood, of course, that it is not desired that the invention be limited thereto since modifications may be made, and it is therefore, contemplated by the appending claims to cover any such modifications as fall within the true spirit and scope of the invention.

What is claimed is:

1. In a control circuit for generating alternating current pulses at a sub-multiple frequency of an alternating current reference voltage:

a full wave rectifying bridge network connectable to the alternating current reference voltage and operable to convert the sinusoidal current waveform of the source to a unidirectional current waveform in which the half cycles thereof are all of one polarity, a controlled rectifier having a gating terminal, sawtooth waveform generator circuit means coupled to the rectifying bridge network to receive the unidirectional current converted thereby and connected to the gating terminal of said controlled rectifier and being operable to generate and deliver successive sawtoothed shaped pulses of like polarity thereto, said waveform generator circuit means including one or more resistances each having a resistive value different from any other such resistance and being capable when coupled into the circuit of the waveform generator means to produce a sawtooth-shaped pulse having a time span equal to the duration of three or higher odd numbers of consecutive half cycles of the reference voltage but differing from one another in the number of half cycles in the span thereof and further including means for selectively coupling each such resistance into the waveform generator circuit, and control means responsive to the zero crossings of the reference voltage for controlling the waveform generator circuit means and operable to superimpose voltage spikes on the sawtooth waveforms produced by the waveform generator which extend in the same direction of amplitude as the waveforms and which coincide in time to all of the zero crossings of the reference voltage for timing the start and termination of each such sawtooth waveform, whereby a selected odd numbered sequence of half cycles of the reference voltage may be supplied by the control circuit with an alternating frequency less than that of the referenced voltage.

2. The aparatus as defined in claim 1 wherein an additional resistance is provided which may be selectively coupled into the sawtooth waveform generator circuit, said resistance having a resistive value such as to produce a sawtooth-shaped pulse having a time span equal to the duration of an even number of consecutive half cycles of the reference voltage whereby when such resistance is coupled into the generator circuit it will cause the latter to supply half cycles of the reference voltage which are all of one polarity.

3. A circuit for controlling the operation of an alternating current responsive motor from an alternating current reference voltage comprising:
a full wave rectifying bridge network connectable with such a motor and operable to convert the sinusoidal current waveform of the reference voltage to a unidirectional current waveform in which the half cycles thereof are all of one polarity,
controlled rectifier means coupled to the rectifying bridge network and having terminal means for gating the same,
a wave generator circuit coupled to the rectifying bridge network to receive the unidirectional current converted thereby and connected to the gating terminal means of said controlled rectifier means and including a unijunction transistor and a capacitor coupled to the input of the unijunction transistor, and resistance means comprising one or more resistances and means for selectively coupling the same to the capacitor and to the input of the unijunction transistor, said one or more resistances each having such a resistive value as to cause the generator circuit to produce successive pulses of sawtooth wave-shape having a distinctive duration differing from that of any other such resistance but approximately equivalent to a distinctive odd multiple number of half cycles of the reference voltage, and control means for synchronizing the operation of the wave generator circuit with the reference voltage by producing voltage spikes similar in polarity to the sawtooth waveforms produced by said wave generator circuit and superimposing such voltage spikes on the sawtooth waveforms which extend in the same direction of amplitude as the waveforms and which coincide in time with all of the zero crossings of the reference voltage for timing the start and termination of each sawtooth pulse with zero crossings of the reference voltage, whereby selected odd numbered sequences of half cycles of the reference voltage may be supplied to the motor with an alternating frequency less than that of the reference voltage.

4. Wave generating apparatus for controlling the speed of a motor responsive to alternating current powering means, comprising:
a full wave rectifying bridge network connectable to such a motor and operable to convert the sinusoidal current waveform of the powering means to a unidirectional current waveform in which the half cycles thereof are all of one polarity.
two sets of controlled rectifiers incorporated in said bridge circuit, the rectifiers in each set being disposed in diametrically opposite branches of the bridge circuit and each having a gating terminal,
a sawtooth wave generator coupled to the rectifying bridge network to receive the unidirectional current converted thereby and including a unijunction transistor normally biased in a high impedance condition and capacitive means coupled to said unijunction transistor and operative periodically to discharge therethrough when its charge attains the peak-point voltage of the unijunction transistor,
a pair of pulse transformers having their secondaries coupled individually to the two sets of controlled rectifiers,
a trigger circuit coupled to said pair of pulse transformers and including gating means responsive to successive sawtooth pulses delivered by said unijunction transistor to said pair of transformers for alternately enabling the same for the duration of each of the sawtooth pulses,
a control circuit coupled to said capacitive means and to said unijunction transistor and including means responsive to the alternating current powering means for producing relatively low voltage signals coinciding in time with the zero crossings of the alternating current and further including means for impressing such signals on the sawtooth waveforms produced by the wave generator and on the primaries of the pair of pulse transformers whereby as each transformer of said pair of transformers is enabled it will trigger the set of rectifiers to which it is coupled and permit the alternating current powering means to drive the motor, and
means for selecting the duration of the waveform produced by the wave generator so that the peak-point voltage of each sawtooth waveform is reached when two or more of the voltage signals are impressed thereon by the control circuit.

5. The apparatus defined in claim 4 characterized in that the waveform duration selecting means includes a plurality of resistances of different resistive values each capable when coupled into the circuit of the wave generator to cause the latter to produce sawtooth wave-shaped pulses having a time span approximately equivalent to a multiple number of half cycles of the alternating current of the power means, and further includes switch means for selectively coupling any one of the plurality of resistances into the circuit of the wave generator.

6. Wave generating apparatus for controlling the speed of a motor responsive to alternating current powering means, comprising:
a full wave rectifying bridge network connectable to such a motor and operable to convert the sinusoidal current waveform of the powering means to a unidirectional current waveform in which the half cycles thereof are all of one polarity,
two sets of controlled rectifiers incorporated in said bridge circuit, the rectifiers in each set being disposed in diametrically opposite branches of the bridge circuit and each having a gating terminal,
a pair of pulse energy converting means each having an input and output and each further having its output connected to the gating terminal of an individual one of two sets of controlled rectifiers,
a wave generator for generating sawtooth-shaped pulses and coupled to said rectifying bridge network to receive the unidirectional current converted thereby,
a switching circuit coupled to said wave generator and said pair of pulse energy converting means and including gating means responsive to successive ones of said sawtooth pulses generated by said wave generator for alternately enabling said pair of energy converting means for the duration of each of the sawtooth pulses,
a control circuit including means responsive to the alternating current powering means for producing relatively low voltage signals coinciding in time with the zero crossings of the alternating current and further including means for impressing such voltage signals on the sawtooth waveforms produced by the wave generator and also for applying such voltage signals to the inputs of said pair of pulse energy converting means whereby as each one of the pair of energy converting means is enabled it will be pulsed by said voltage signals and trigger the firing of the set of rectifiers to which the enabled one is connected thereby permitting the alternating current power means to drive the motor, and
means for selecting the duration of the waveform produced by the wave generator so that the peak-point voltage of each sawtooth waveform is reached at a time when one of the voltage signals is impressed thereon by the control circuit.

7. Wave generating apparatus for controlling the speed of a motor responsive to alternating current powering means, comprising:
bilateral network means connectable to such a motor and having two branches operable to convert the sinusoidal current waveform of the powering means to a unidirectional current waveform in which the half cycles thereof are all of one polarity,
controlled rectifier means incorporated into the branches of said bilateral network means and being divided into two sets, the controlled rectifier means of each branch having an input terminal,
wave generator means for generating sawtooth-shaped pulses of similar shape having a time span equal to the duration of two or more consecutive half cycles of the alternating current powering means, said generator means being coupled to said rectifying bridge network to receive the unidirectional current converted thereby,
a switching circuit coupled to said wave generator means and to the inputs of said controlled rectifier means and including means responsive to successive ones of said sawtooth pulses generated by said wave generator means for alternately enabling each of said controlled rectifier means for the time span of said sawtooth pulses, and
a control circuit including means responsive to the alternating current powering means for producing voltage signals coinciding in time with the zero crossings of the alternating current and being effective at each such crossing to apply such voltage signals to the wave generator means thereby to drive the motor at a sub-multiple frequency of the alternating current powering means.

8. The apparatus as defined in claim 7 wherein means is included in the control circuit for impressing said voltage signals on the sawtooth waveforms produced by the waveform generator so that the peak-point voltage of each sawtooth waveform is reached at a time when one of said voltage signals is impressed thereon.

9. Wave generating apparatus for controlling the speed of a motor responsive to alternating current powering means, comprising:
bilateral network means connectable to such a motor and having two branches operable to convert the sinusoidal current waveform of the powering means to a unidirectional current waveform in which the half cycles thereof are all of one polarity,
controlled rectifier means incorporated into the branches of said bilateral network means and being divided into two sets, the controlled rectifier means of each branch having an input terminal,
a wave generator for generating sawtooth-shaped pulses of similar shape having a time span equal to the duration of two or more consecutive half cycles of the alternating current powering means, said generator being coupled to said rectifying bridge network to receive the unidirectional current converted thereby,
a switching circuit coupled to said wave generator and to the inputs of said controlled rectifier means and including means responsive to successive ones of said sawtooth pulses generated by said wave generator for alternately enabling each of said controlled rectifier means for the time span of said sawtooth pulses, and
a control circuit including means responsive to the alternating current powering means for producing voltage signals coinciding in time with the zero crossings of the alternating current and being effective at each such crossing to apply such voltage signals to the wave generator thereby to drive the motor at a sub-multiple frequency of the alternating current powering means, and
means for varying the time span of the sawtooth-shaped pulses from two to a higher number of consecutive half cycles of the alternating current powering means.

10. The apparatus as defined in claim 9 wherein the means for varying the time span of the sawtooth pulses includes a plurality of impedances of different values each capable when coupled into the circuit of the wave generator to cause the latter to produce a sawtooth wave-shaped pulse of a time span differing from the pulse caused to be produced by any other of said impedances, and further includes switch means for selectively coupling any one of the plurality of impedances into the circuit of the wave generator.

11. A control circuit for generating alternating current pulses at a sub-multiple frequency of an alternating current reference voltage, comprising:

bilateral network means connectable to an alternating current reference voltage and having two branch portions, controlled rectifier means incorporated into each of the branch portions of said bilateral network and each having an input terminal, means for generating pulses having a time span equal to the duration of a plural number of consecutive half cycles of the alternating current reference voltage, circuit means coupled to said generating means and to the inputs of said controlled rectifier means and including means responsive to successive ones of said pulses for alternately enabling each of said controlled rectifier means for the time span of said pulses, and a control circuit including means responsive to the reference voltage for producing voltage signals coinciding in time with the zero crossings of the alternating current of the reference voltage and being effective at each such crossing to apply such voltage signals to the means for generating pulses thereby to supply alternating current at a sub-multiple frequency of the reference voltage.

12. The apparatus as defined in claim 11 wherein means is included for utilizing certain of said voltage signals for timing the start and termination of the pulses produced by said pulse generating means.

13. The apparatus as defined in claim 11 wherein the pulses produced by said pulse generating means are of the same sawtooth formation.

14. The apparatus as defined in claim 11 wherein the pulses produced by said pulse generating means are of the same sawtooth formation and wherein means is included in the control circuit for impressing a plural number of said voltage signals as voltage spikes on each of said sawtooth-shaped pulses and for utilizing certain of such spikes for controlling the start and termination of the sawtooth-shaped pulses.

15. A control circuit for generating alternating current pulses at a sub-multiple frequency of an alternating current reference voltage, comprising:

bilateral network means connectable to an alternating current reference voltage and having two branch portions, controlled rectifier means incorporated into each of the branch portions of said bilateral network and each having an input terminal, means for generating pulses having a time span equal to the duration of a plural number of consecutive half cycles of the alternating current reference voltage, circuit means coupled to said generating means and to the inputs of said controlled rectifier means and including means responsive to successive ones of said pulses for alternately enabling each of said controlled rectifier means for the time span of said pulses, and a control circuit including means responsive to the reference voltage for producing voltage signals coinciding in time with the zero crossings of the alternating current of the reference voltage and being effective at each such crossing to apply such voltage signals to the means for generating pulses thereby to supply alternating current at a sub-multiple frequency of the reference voltage, and means for varying the time span of the pulses produced by said generating means from two consecutive half cycles of the alternating current of the reference voltage to a higher number of such consecutive half cycles.

16. In a control circuit for generating alternating current pulses at a sub-multiple frequency of an alternating current reference voltage:

a full wave rectifying bridge network connectable to the alternating current reference voltage and operable to convert the sinusoidal current waveform of the source to an unidirectional current waveform in which the half cycles thereof are all of one polarity, controlled rectifier means coupled to the rectifying bridge network and having terminal means for gating the same, a sawtooth waveform generator circuit means coupled to the rectifying bridge network to receive the unidirectional current converted thereby and connected to the terminal means of said controlled rectifier means and being operable to generate and deliver successive sawtoothed shaped pulses of like polarity thereto, said waveform generator circuit means including one or more impedances each having an impedance value different from any other such impedance and being capable when coupled into the circuit of the waveform generator circuit means to produce a sawtooth-shaped pulse having a time span equal to the duration of two or more consecutive half cycles of the reference voltage but differing from one another in the number of half cycles in the span thereof and further including means for selectively coupling each such impedance into the waveform generator circuit, and control means connectable to the alternating current reference voltage and responsive thereto for producing voltage signals coupled to said waveform generator circuit means for timing the start and termination of the sawtooth waveforms generated by said waveform generator circuit means, said voltage signals extending in the same direction of amplitude as the sawtooth waveforms and coinciding in time to all of the zero crossings of the reference voltage, whereby the coupling of any one of said impedances into the waveform generator circuit means will cause the control circuit to supply voltage at a sub-multiple frequency of that of the reference voltage.

* * * * *

UNITED STATES PATENT OFFICE
CERTIFICATE OF CORRECTION

Patent No. 3,757,184  Dated September 4, 1973

Inventor(s) Robert D. Chute

It is certified that error appears in the above-identified patent and that said Letters Patent are hereby corrected as shown below:

Abstract, line 4, delete "bilateral network in the form of a".

Col. 2, line 54, after "of a" insert --bilateral network in the form of a--.

Col. 6, line 12, change "4A and 4E" to --4A to 4E--.

Signed and sealed this 25th day of December 1973.

(SEAL)
Attest:

EDWARD M. FLETCHER, JR.
Attesting Officer

RENE D. TEGTMEYER
Acting Commissioner of Patents